United States Patent [19]

Stauffer et al.

[11] 4,222,980
[45] Sep. 16, 1980

[54] METHOD FOR CONTINUOUSLY MAKING CABLE

[75] Inventors: John D. Stauffer, De Kalb, Ill.; Edwin H. Arnaudin, Jr., Marion; Willis L. Chrisman, Fairmount, both of Ind.

[73] Assignee: Anaconda Wire and Cable Company, Greenwich, Conn.

[21] Appl. No.: 837,985

[22] Filed: Sep. 29, 1977

Related U.S. Application Data

[60] Continuation of Ser. No. 115,627, Feb. 16, 1971, abandoned, which is a division of Ser. No. 842,418, May 7, 1969, Pat. No. 3,645,656.

[51] Int. Cl.² .................... B29D 3/00; B29G 2/00; B29H 5/28
[52] U.S. Cl. .................... 264/85; 264/174; 264/345; 264/347
[58] Field of Search .............. 425/72, 444, 71, 72 R, 425/97, 101, 113, 122, 404, 445, 461; 264/174, 236, 347, 348, 85, 345

[56] References Cited

U.S. PATENT DOCUMENTS

| | | | |
|---|---|---|---|
| 1,289,043 | 12/1918 | Comstock | 264/347 |
| 1,986,106 | 1/1935 | Gibbons et al. | 264/347 |
| 2,373,816 | 4/1945 | De Roche et al. | 264/347 |
| 2,426,341 | 8/1947 | Canfield | 264/348 |
| 2,561,820 | 7/1951 | Ramsey et al. | 264/347 |
| 2,581,230 | 1/1952 | Berggren | 264/347 |
| 2,581,255 | 1/1952 | Henning | 264/347 |
| 3,513,228 | 5/1970 | Miyauchi et al. | 264/174 |

Primary Examiner—W. E. Hoag
Attorney, Agent, or Firm—Pennie & Edmonds

[57] ABSTRACT

Method and apparatus are disclosed for continuously manufacturing a cable of the type having a central conductor around which are concentrically arranged successive outer layers; electrostatic shielding, insulation and jacket layers. The method and apparatus includes unique means for vulcanizing the insulation layer and for subsequent cooling.

6 Claims, 7 Drawing Figures

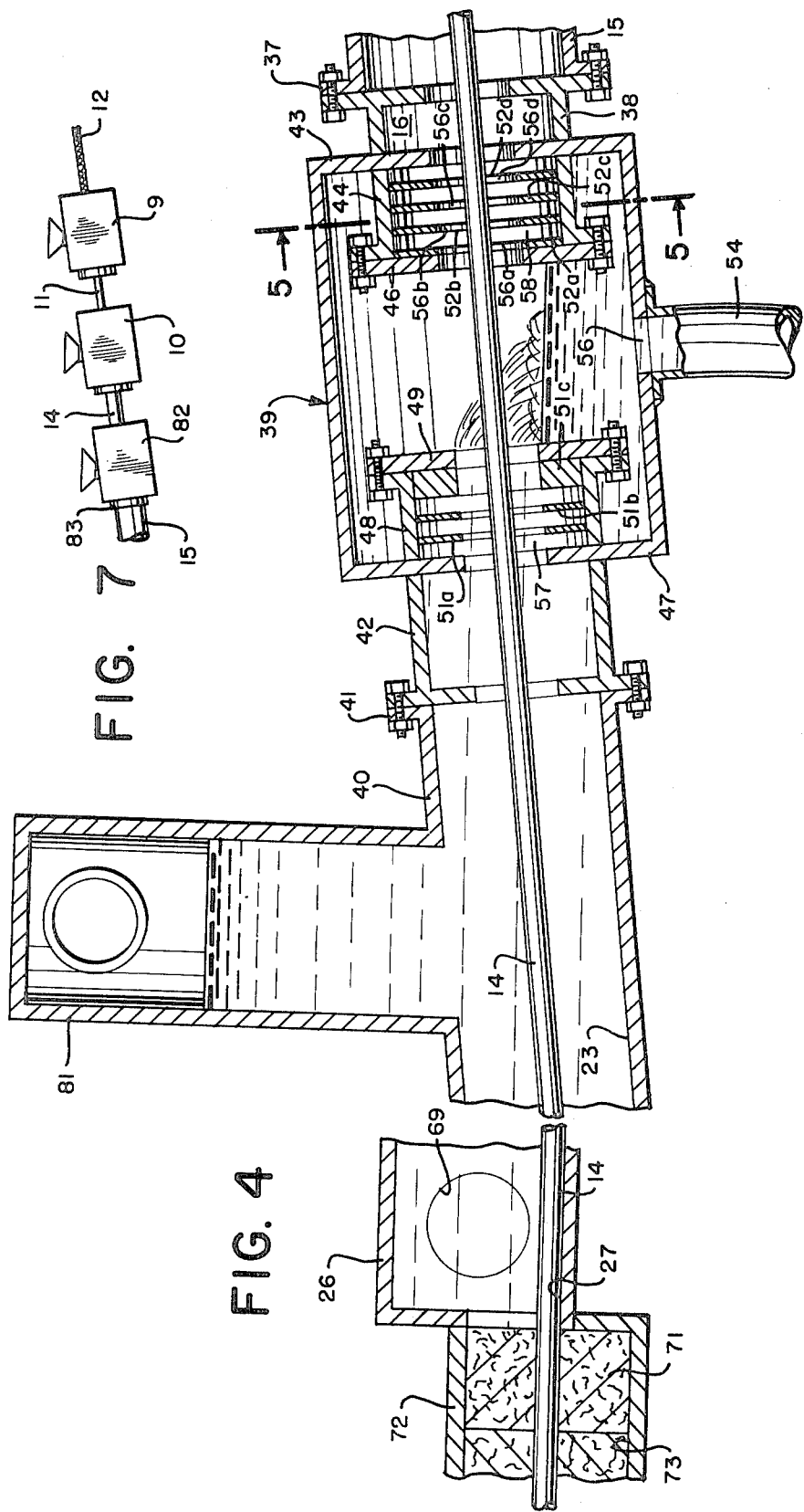

METHOD FOR CONTINUOUSLY MAKING CABLE

CROSS-REFERENCE TO RELATED APPLICATIONS

This application is a continuation of application Ser. No. 115,627, filed Feb. 16, 1971, now abandoned, which, in turn, is a division of application Ser. No. 842,418, filed May 7, 1969, now U.S. Pat. No. 3,645,656.

FIELD OF THE INVENTION

This invention relates to the manufacture of conductors and, more particularly, to the manufacture of commercial cables having a central conducting strand of copper surrounded by successive concentric insulating and protective layers.

BACKGROUND OF THE INVENTION

It is known to produce cables by taking a central conductor, for example, of stranded copper and extruding thereupon an electrostatic shielding followed by a layer of insulation. The electrostatic shielding is made of a semiconducting material and forms a smooth surface which, if the conductor is used to carry high voltage will obviate corona discharge from the relatively sharply curved outer circumference of the conductor. Another function of the semiconducting electrostatic shield is to provide a smooth conducting surfce inside the insulation layer to maintain the inner surface of the insulation at constant potential. These two functions minimize electrical erosion of the insulation layer which is of a polymeric material having high dielectric strength.

As a final step, a jacket of polyvinyl chloride composition may be extruded about the insulated cable, the jacket providing moistureproofing and mechanical protection. Intermediate the jacket and insulation layers it is usual to provide ground wires which maintain the exterior of the insulation layer and inner surface of the jacket at a common potential. As a consequence of the semiconductive shielding and ground wire systems, electrical stress across the insulation will be uniform and the possibility of failure of the insulation due to electrical causes is minimized.

The foregoing describes generally the constituents of commercial cable construction. Heretofore, the steps of applying the various concentric layers have been carried out separately, that is to say, discontinuously. Such separate manufacture has required considerable expense, separate storage and handling of the cable at different stages of its manufacture, with the possibility of damage to interior portions of the cable prior to its completion. Furthermore, apparatus which might readily be used during more than one step was unnecessarily duplicated.

It is the object of the present invention to provide an improved method and apparatus for the manufacture of commercial cable by means of a continuous process, which avoids many of the difficulties inherent in prior methods.

It is another object of the present invention to provide a superior method and apparatus for vulcanizing an extruded insulation layer for cooling the cable thereafter.

SUMMARY OF THE INVENTION

In accordance with the teachings of the invention, a method and apparatus are disclosed whereby commercial cable of the type having a central conductor and outer concentric layers thereupon is continuously manufactured by a succession of closely related steps. These steps include the extrusion of a semiconductive shield upon a stranded conductor and immediately thereafter the extrusion of a layer of insulation having high dielectric strength. The insulation is immediately vulcanized by passing through a novel vulcanizing chamber containing a pressurized noncondensing gas and therefrom to a cooling or quenching chamber. Finally, as the insulated cable emerges from cooling it is fed directly into an extrusion head which extrudes simultaneously thereupon a combination of ground wire and outer jacket. In an alternative form of the invention, the jacket is extruded about the insulation layer prior to the vulcanization step. In either case, the continuous process will produce a superior cable and better bonding between insulation and jacket layers.

BRIEF DESCRIPTION OF THE DRAWINGS

FIGS. 4, 5 and 6 are enlarged sectional views taken respectively along the lanes of 4—4 of FIG. 2, 5—5 of FIG. 4 and 6—6 of FIG. 2;

FIG. 7 shows a partial diagrammatic side view of an alternate form of apparatus according to the invention.

DESCRIPTION OF A PREFERRED EMBODIMENT

Figure 1:
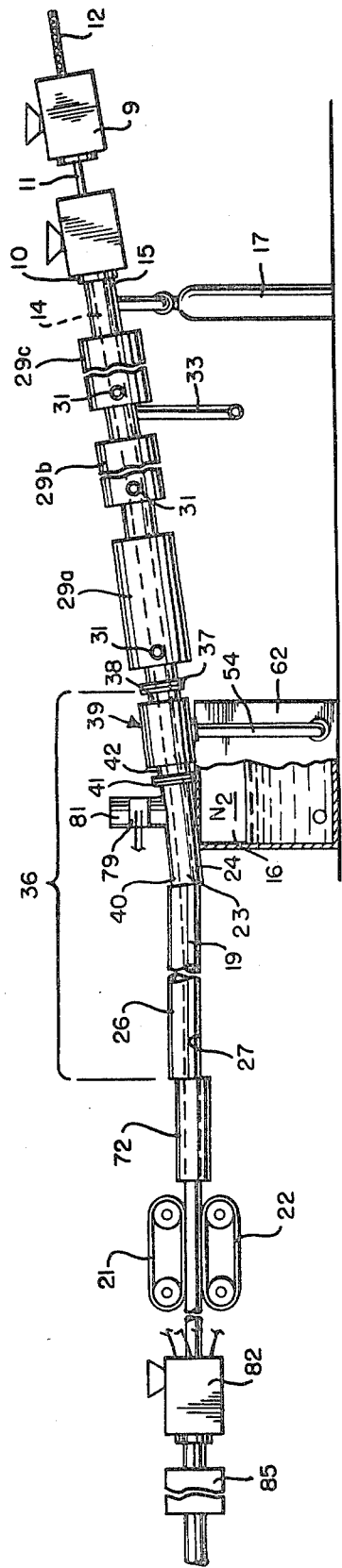
FIG. 1 shows a diagrammatic side view of an apparatus for continuously manufacturing cable according to the invention.
Figure 2:
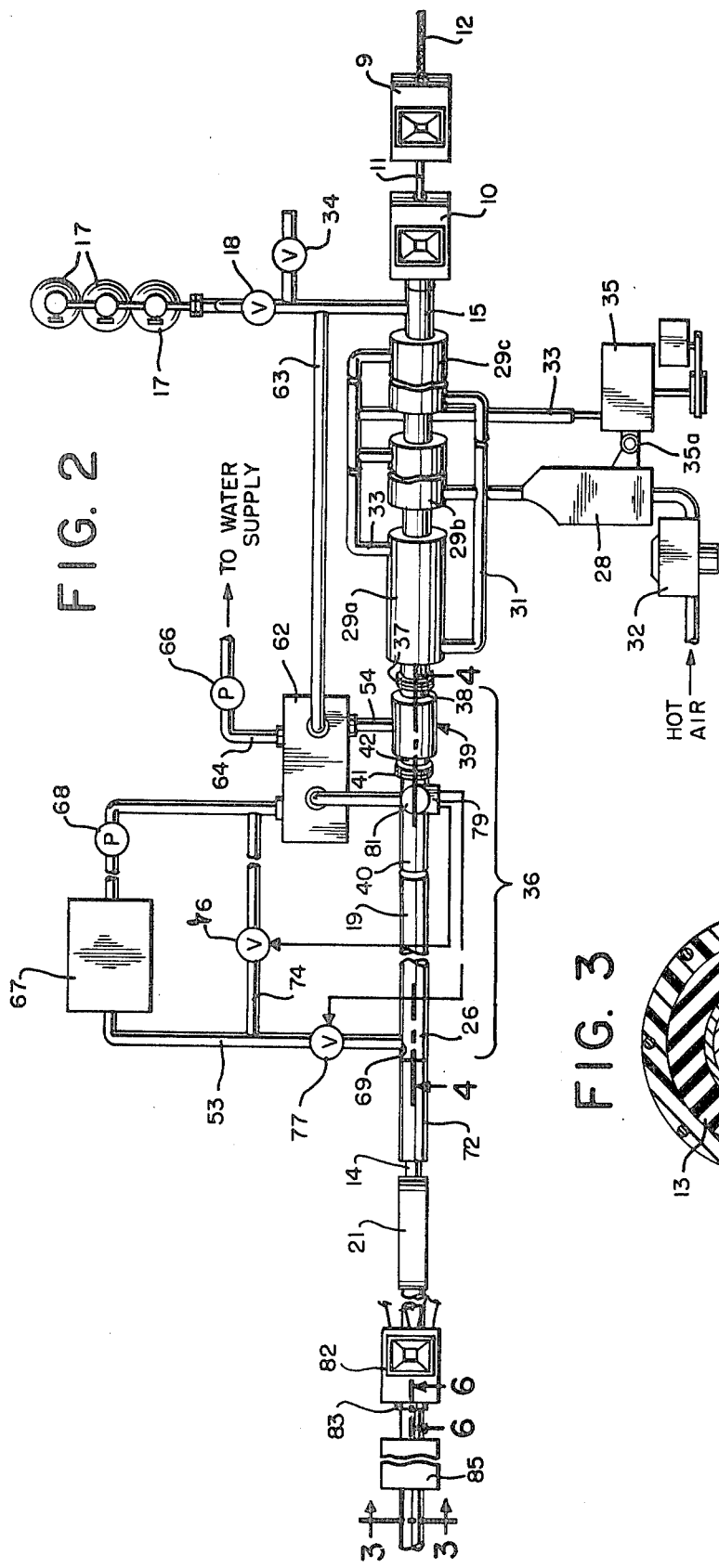
FIG. 2 shows a diagrammatic top view of the apparatus of FIG. 1.
Figure 3:
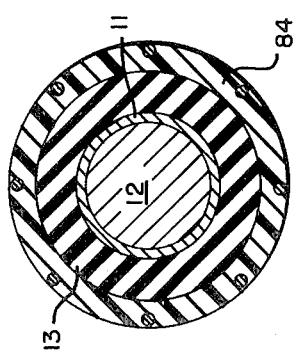
FIG. 3 is an enlarged cross-sectional detail of the finished cable.

Referring to FIGS. 1 and 2, the apparatus shown comprises the extrusion heads 9 and 10 of which a number of suitable types are known and which are associated with extrusion machines of a known type (not shown). A core 12 continuously enters the extruder 9 where it is covered with a thin layer 11 of semiconducting thermoplastic strand shielding that is capable of becoming thermosetting upon the addition of a suitable vulcanizing agent. A suitable composition for the strand shielding 11 comprises 31 parts of conducting carbon black, such as Vulcan XC-72 available from Godfrey L. Cabot, Inc., 77 Frnklin Street, Boston 10, Mass., and 69 parts of ethylene-propylene-(diene monomer) tripolymer, such as EPDM available from E. I. duPont deNemours & Co., Inc., wherein the diene monomer comprises 1,4 hexadiene. The thickness of the layer 11 is about 5 mils or less and its purpose is essentially to coat the inside surface of the insulation wall with a semiconducting layer that will eliminate areas of electrical stress between the conductor and the insulation wall which might be sources of ionization. The particular advantage of the composition used for the shielding layer 11 is that the composition is itself free from vulcanizing agents and, consequently, temperatures of 430° F. and higher can be maintained at the extrusion die, the reduced viscosity of the extrudate at such high temperature permitting reduction in wall thickness without danger of pinholes.

The core 12 next enters extruder 10 wherein it is covered with a polymeric insulation layer 13 which is thermoplastic within the extruder head but can be irreversibly cured or set by the application of heat. The core 12, shielding layer 11 and insulation layer 13 form a cable 14. A number of suitable polymeric materials having high dielectric strength for forming the insulation layer 13 are known such as natural and synthetic rubbers and polyethylene containing appropriate known types of vulcanizing agents. During the extrusion of insulation layer 13, the vulcanizing agent will diffuse to an extent into the shielding layer 11.

To assist the application of heat to vulcanize layers 11 and 13 core 12 may be heated by resistance or inductive heating before entering or after leaving extruder head 9 and before entering insulation extruder 10, so that the sensitive heat of the core can contribute to the subsequent curing process.

The extruder 10 extrudes the polymeric covered cable directly into a curing tube or vulcanizing tube 15 which is filled with nitrogen 16 under a superatmospheric pressure supplied by a battery of nitrogen cylinders 17. The pressure in vulcanizing tube 15 is controlled by a reducing valve 18 or other known means to a value such that a compression of cable 14 is effected to prevent the layer 13 from being porous or forming voids or bubbles. It has been found, for example, that a pressure of about 70 to 300 psi is satisfactory and higher pressures would have disadvantages of requiring the walls of tube 15 be made thicker and require the special construction of end seals. Once the nitrogen 16 has been introduced into tube 15, it remains substantially stagnant or unchanged since there is very little leakage.

The nitrogen 16 serves to transfer heat by convection to the cable 14 in addition to compressing the extruded layers 11 and 13. Since the transfer of heat is essentially radial it is not necessary for the nitrogen to circulate along the tube 15 although, of course, a certain amount of such circulation is unavoidably caused by the advance of the cable 14. The nitrogen 16 is stagnant or unchanged in the sense that leakage is kept to a minimum by means hereinafter to be explained. This stagnant property of the nitrogen 16 has the important advantage of reducing the heat transfer at the ends of the tube 15 where relatively cool pockets of the gas can accumulate and serve as insulation. Steam-filled tubes cannot function in this manner since steam will condense on any cool surfaces and steam vapor immediately replenishes the condensate.

The tube 15 is seen in FIG. 1 to have the form of a catenary with its highest point at the extruder 10 and its lowest point at a section 19. The catenary is chosen to match the curvature of the cable 14 as it depends from extruder 10. Consequently the insulation layer 13 of cable 14 will not touch the walls of the tube 15. A constant curvature is maintained by placing the cable 14 under suitable tension by means of a capstan 21. The core 12 is paid into extruders 9 and 10 at constant speed by another capstan, not shown. With the cable 14 so maintained in catenary curvature it is a feature of the present invention that the floor 23 of the tube 15 and any continuing tubes or chambers are always separated from the surface of the cable by a gap 24. At the base of the catenary, however, tube extension 26 has a floor 27 which is stepped up from the floor 23 at a distance equal to the gap 24. At this point, however, the insulation layer 13 will have cooled so that the cable can ride upon the floor 27, which thus serves as the lower terminus of the cable catenary.

The nitrogen gas 16 in the tube 15 is heated by means of hot air and combustion gases from a furnace 28. The heated gases are circulated through sections 29a, 29b, 29c collectively comprising a jacket surrounding the tube 15. The hot air enters the jacket through a manifold 31 driven by a blower 32 and is returned to the furnace 28 through a manifold 33. A temperature sensing control 35 operating the vent 35a can be adjusted to control the temperature of the recirculation gases which are maintained at about 650° F.

Heavy walls of heat insulation (not shown) cover the outside surfaces of the jackets and manifolds in the usual manner. Very high temperatures, limited only by the heat tolerances of the structural materials of the tube can thus be applied to the apparatus without increasing the internal pressure of the nitrogen 16 which can be released by an appropriate check valve 34 if this is desired. There is an advantage, particularly at high temperatures, to use an inert gas, such as nitrogen, for transferring heat to the insulation layer 13 since contact with air at high temperature would have an adverse oxidizing effect on the polymer. But is is cheaper to circulate a free gas such as air through the furnace 28 and manifolds 31, 33 which do not then have to be leak proofed beyond the requirements of any hot air system. Nitrogen is also, of course, conserved by the provision, already discussed, that the supply 16 is stagnant.

An important novel feature of our apparatus is comprised in the means for transition between the heated tube 15 and a cooling chamber 36 through which refrigerated water is circulated at high velocity. This transition means is shown most fully in FIG. 4 where the catenary tube 15 is seen to be connected by means of a flange 37 to a flanged cylinder 38 that is welded to an enlarged sump enclosure 39. Similarly a pipe 40 is connected by means of a flange 41 to a flanged cylinder 42 that is welded to the opposite (downstream) end of the enclosure 39.

Figure 5:
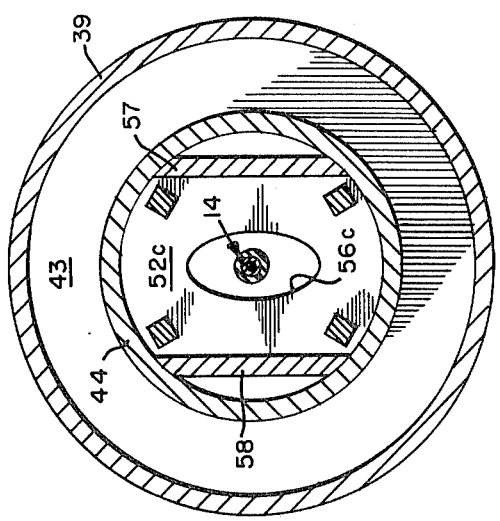

Projecting inwardly from an upstream wall 43 of the enclosure 39 there is welded a cylinder 44 to which is fastened a retaining plate 46 and projecting inwardly from a downstream wall 47 is welded a cylinder 48 with a retaining plate 49. The retaining plates 46 and 49 combined with the walls 43,47 serve to confine baffle plates 51a, 51b, 51c and 52a, 52b, 52c and 52d within the respective cylinders 48 and 44. The plates 51a-c and 52a-d are seen to have vertical sides 57,58 (FIG. 5) so that they can be restrained from rotation by guide plates 59a and 59b, and 61a and an opposing guide plate that does not show in the drawing. The cylinder 48, pipe 40, tube section 26 and sump enclosure 39 together comprise the aforementioned cooling chamber 36 through which refrigerated water is circulated.

The water enters the chamber 36 downstream (from the point of view of the cable movement) through a pipe 53 (FIG. 2) and leaves through a pipe 54 that opens into the bottom of the enclosure 39 from a point 56 between the innermost baffle plates 51c and 52a. The pipe 54 and enclosure 39 constitute a sump for collecting cooling water before it can enter the tube 15. Entry of water into the tube 15 is further prevented by the baffle plates 52a–d which have centered elliptical openings 56a–d sufficiently oversized to assure that the insulation layer 13 will not contact the sides of the openings but small enough substantially to keep water from splashing upstream into the tube 15. It will be understood, in this regard, that the shape of the catenary curve formed by the cable is maintained under close control in a known manner by varying the tension being applied by the capstan 21 in response to a position sensing device within the tube 15. This device is not shown in the drawing but several types are commercially available. The openings 56a–d are elongated vertically to accommodate the riser of the catenary without permitting contact of the baffle plate with the cable as it advances through our apparatus. The pipe 54 is large enough to provide exhaust gravity flow for all the water from chamber 39 that is needed to cool the largest cable that will be processed in the apparatus.

Pipe 54 empties into a storage tank 62 which is maintained at the system pressure by a connection 63 to the nitrogen line. Storage tank 62 provides a means whereby any nitrogen gas which becomes mixed with water in the sump can separate out into the upper part of the tank and return to chamber 39. The level of water in the storage tank 62 is maintained by a pump 66 having a water source (not shown) whose operation is controlled by known means (not shown) sensing the water level in the tank 62. Water from the tank 62 is circulated at a high speed by another pump 68 through a refrigerator 67 into the tube section 26 just upstream of a conventional series of pressure seals 71(FIG. 4). The water fills tube section 26 and it is in this section that cooling of the advancing cable is achieved.

Coventional seals can be used at the downstream end of the tube 26 since the insulation layer 13 is cool and hard as a result of the extraction of heat by the cooling water. A length of pipe 72, however, which contains the seals 71 is dropped so that its floor 73 is lower than the floor 27, thus the cable which has been riding on the floor 27 can be centered in the seals 71.

Pump 68 is operated continuously to circulate cooling water through the section, sump or chamber 39 and therefrom to storage tank 62. The by-pass pipe 74 and automatic valve 76 are provided to allow excess water to circulate when it is not needed for cooling the chamber 36. Automatic control of the valve 76 and the valve 77 is a pipe 33 connected at its junction 69 with tube section 26 is accomplished as follows: A riser 31 extends vertically from pipe 40 which is immediately downstream of the sump 39. The top of the riser 31 is connected by suitable piping to the top of the tank 62 so that there is high pressure nitrogen therein above the water level at the pressure of the nitrogen system. A suitable level sensing control 79 is located in the riser 81 for sensing the water/gas level therein. The control 79 is adapted to activate valves 76,77 and by this means regulate the flow of coolant into the tube section 26 which will maintain a predetermined height of water in the riser 81. Except for the upstream end of the enclosure 39, the chamber 36 is entirely full of refrigerated, rapidly moving water which enters through the pipe 53 and leaves through the pipe 54A. The pressure of the water in tube section 21 and sump enclosure 39 is therefore higher than the pressure of nitrogen by a factor equal to the head of the riser 31. This excess pressure, in combination with the baffle plates 51a–c is sufficient to prevent nitrogen from advancing downstream of the sump enclosure 39. The riser 81 will also accommodate surges of water pressure to an extent which may occur and thus cooperates with the baffle plates 52a–d to prevent the admission of water into the vulcanizing tube 15. It is important to note that prior systems using steam for vulcanizing having a steam cooling water interface actually provided vulcanizing tube of indeterminate length because of constant surges of water into the steam filled tube. This defect is eliminated by the present invention.

Except for slight amounts of nitrogen which have dissolved in the water and thereafter escapes past the seals 71 there is essentially no nitrogen loss, with the result that the body of nitrogen remains stagnant or unchanging and the cost of this gas is negligible except for refilling after shutdown. The nitrogen provides means for maintaining the insulation layer 13 under pressure during curing and cooling and of transferring heat to the insulation layer from the circulating hot air. Transfer of heat from the nitrogen to the cooling water is minimized by the fact that water contact with nitrogen is essentially restricted to the sump enclosure 39 since the water is withdrawn so rapidly by gravity flow from the sump that it cannot enter upstream past the baffle plates 52a–d. The nitrogen in the sump enclosure 39 is rapidly cooled, and since it is stagnant serves as heat insulation against heat transfer from the water to the hotter nitrogen body. The difference between the disclosed arrangement and a steam vulcanizing system of the usual type is of great importance to obtain the maximum cooling effect from the water, for if the nitrogen was replaced by steam, not only would the insulating effect of the cooled nitrogen be lost but the heat of vaporization and sensitive heat of water condensed from the stream would be added to the cooling load. As a result it has been found that the length of the cooling chamber 36 required by our apparatus is one-third less than that required in conventional steam vulcanizers.

However, the sump and baffle-plate combination of the interface of the heating-cooling system will have useful application to systems employing steam either live or superheated, instead of nitrogen. When used in a steam system positive pumping means should be installed in the pipe 54 to withdraw a small amount of steam, along with the water.

Figure 6:
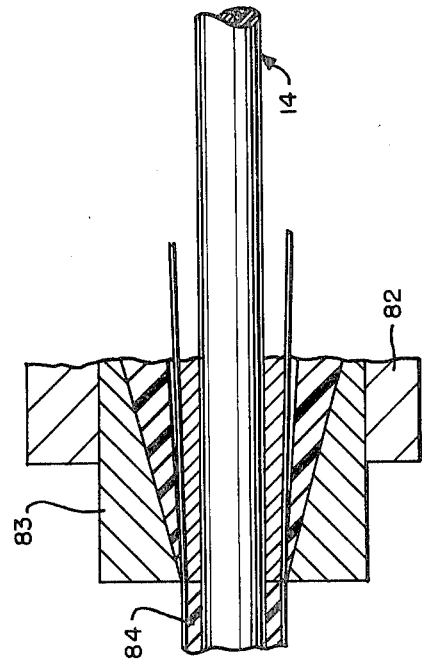

After emerging from seals 71, the now insulated cable is first dried by a sponge type drier (not shown) such as described in U.S. Pat. No. 3,386,120 and is then fed directly into a jacket extruder 82 to complete the process of manufacturing. The rate of extrusion in the extruder 82 will be governed largely by the rate at which vulcanization and cooling of the cable takes place previously. With reference to FIG. 6, the extruder head 83 is shown depositing in combination, an extruded semiconducting polymeric coating 84 in which are embedded axially arranged ground or drain wires. By this method of manufacture, the drain wires are applied during the extrusion operation at extrusion speeds and the wires are securely embedded in the semiconducting jacket. Upon leaving the head 83, the cable passes through an apparatus 85 which may be solely a cooling apparatus, or if vulcanizing and cooling is required, the apparatus 85 may be similar in all respects to that hereinabove described.

In an alternate form of the present invention (see FIG. 7), the jacket extrusion step is accomplished immediately following extrusion of the insulation layer. Accordingly, there are provided extrusion heads 9', 10' and 83', the latter being directly connected in sealing engagement with the vulcanizing tube 15'. Although the extruder heads have been shown separately, it will be understood that a single multiple extruder may be used. Prior to the insulation extrusion step, where separate extruders are employed, the core may be heated by an electric induction means (not shown) to add the sensitive heat of the core to the vulcanizing heat provided in the tube 15'. Tube 15' is similar to tube 15 previously described, and will be connected to a cooling chamber similar to chamber 36.

In either of the two forms of jacket extrusion immediately described above, there are particular advantages achieved by having the jacket step performed as a continuous part of the overall cable manufacturing process. For example, in the primary form described in FIGS. 1-6 wherein the jacket is extruded subsequent to vulcanization and cooling of the insulation layer, the continuous process provides superior joining of the jacket to the insulation. One reason for this is that the insulation is entirely free from contamination, distortion, damage or other defects which might very well occur through handling and storage of the insulated cable prior to a delayed final jacket extrusion step. In a process where the jacket requires vulcanization, the bonding effect between jacket and insulation can be further increased, if desired, by undercuring the insulation and curing it finally during vulcanization of the jacket.

A further advantage not so readily apparent is produced by subjecting the metal core for a prolonged period of time to the high heat of the vulcanizing tube 15. During the course of vulcanization of the insulation layer, the metal core becomes heated to a very high temperature and even after the cable has proceeded through the cooling chamber 36, the core remains at an elevated temperature (for example, about 160° F.) This sensitive, retained heat of the core is useful during the jacket extrusion process which immediately follows and will aid in achieving a good bond between the jacket and insulation layers. It is important that this bond be free from voids which might produce corona discharge effects.

The valuable advantages of superior bonding and protection of the insulation layer from defects just referred to with respect to extruding the jacket subsequent to vulcanization and cooling of the insulation layer also apply where the jacket is extruded about the insulation layer prior to the vulcanization step as illustrated in FIG. 7. Of course, in this case the jacket is of a type which requires vulcanization and naturally, due to the combined thicknesses of the respective layers, vulcanization will proceed more slowly.

It will be understood that the foregoing description has related to a particular embodiment or embodiments of the invention and therefore is merely representative. In order to understand fully the spirit and scope of the invention, attention is directed to the appended claims.

I claim:

1. A method of continuously vulcanizing coatings on electric cable comprising forming a coating on a cable, passing said coated cable through a zone of heat and pressure in a chamber, maintaining a noncondensing gas which is inert to said coating in said chamber under several atmospheres pressure and which is maintained relatively stagnant about said cable, heating said gas to a temperature sufficient to vulcanize said coating, directly passing said coated cable from said heating zone through a cooling zone within which said coated cable is in contact with a pressurized cooling fluid circulating therein, and isolating the cooling zone from the heating zone by barrier means located both within said cooling zone and between said zones, said barrier means including a sump chamber and at least two apertured plates at opposite ends of said chamber to prevent substantially the noncondensing gas from movement downstream of the sump chamber and the cooling fluid from entering into the heating zone whereby relatively cool pockets can form at the ends of the heating zone to serve as insulation.

2. The method according to claim 1 wherein each said apertured plate is of a size to isolate said zones, yet permit unobstructive contact-free travel of the cable into the cooling zone.

3. The method according to claim 1 wherein said noncondensing gas is heated by indirect surrounding contact with a hot fluid.

4. A method according to claim 1 in which said gas is heated by indirect surrounding contact with a hot fluid.

5. The method according to claim 4 wherein said cooling fluid is maintained at a pressure at least substantially equal to the pressure of said noncondensing gas.

6. The method according to claim 5 wherein said cooling fluid is maintained at a pressure greater than the pressure of the noncondensing gas to provide further isolative capability in preventing movement of the noncondensing gas downstream of the sump chamber.

* * * * *